US007359900B2

(12) United States Patent
Bogdanov

(10) Patent No.: US 7,359,900 B2
(45) Date of Patent: Apr. 15, 2008

(54) DIGITAL AUDIO TRACK SET RECOGNITION SYSTEM

(75) Inventor: Vladimir Askold Bogdanov, Milan, MI (US)

(73) Assignee: All Media Guide, LLC, Ann Arbor, MI (US)

( * ) Notice: Subject to any disclaimer, the term of this patent is extended or adjusted under 35 U.S.C. 154(b) by 734 days.

(21) Appl. No.: 10/629,372

(22) Filed: Jul. 29, 2003

(65) Prior Publication Data

US 2005/0027689 A1 Feb. 3, 2005

(51) Int. Cl.
*G06F 17/30* (2006.01)
(52) U.S. Cl. .................. 707/6; 707/3; 707/4; 707/5
(58) Field of Classification Search ............... None
See application file for complete search history.

(56) References Cited

U.S. PATENT DOCUMENTS 6,061,680 A * 5/2000 Scherf et al. .................. 707/3
6,252,831 B1 * 6/2001 Wehmeyer ................ 707/104.1
2003/0028796 A1 * 2/2003 Roberts et al. .............. 713/193
2003/0086341 A1 * 5/2003 Wells et al. ............. 369/13.56
2003/0112729 A1 * 6/2003 Nichols et al. .......... 369/53.22
2004/0034441 A1 * 2/2004 Eaton et al. ................... 700/94

* cited by examiner

Primary Examiner—Khanh B. Pham
(74) Attorney, Agent, or Firm—Fitzpatrick, Cella, Harper & Scinto

(57) ABSTRACT

A system and method are provided for matching a track set from a digital audio recording to metadata relating to the recording. Track duration data is obtained for the track set, and the track duration data is rounded. A search is performed for matching records in a first database based on the rounded track duration data, each resulting matching record having an identifier. Track duration data is retrieved from a second database based on the identifiers associated with the matching records. If more than one matching record is found, the track duration data retrieved from the second database is compared to the track duration data obtained for the track set to find a best matching record of in the second database. Metadata contained in the best matching record of the second database is output.

15 Claims, 4 Drawing Sheets

DIGITAL AUDIO TRACK SET RECOGNITION SYSTEM

BACKGROUND OF THE INVENTION

1. Field of the Invention

The present invention relates to systems and methods, including computer systems and methods, for recognizing standard collections of audio tracks such as the ones found on audio compact discs, audio DVDs, or their digitized versions and providing additional information to the user regarding these tracks.

2. Description of Related Art

Methods exist for reading table of contents data from compact discs and using the data to lookup information in databases or to monitor and control the playback of a compact disc. For example, U.S. Pat. Nos. 6,230,192 and 6,330,593 ("the '192 and '593 patents") relate generally to delivering supplemental entertainment content to a user listening to a musical recording. The content is accessed using an Internet Web browser, which is able to control and monitor playback of the recording. Using conventional techniques, an identifier is computed for the CD being played. The identifier may be determined based on the number and lengths of tracks on the CD, which are measured in blocks (frames) of $1/75$th of a second. For example, the identifier may be a concatenation of the track lengths. In practice, to shorten the identifier, the track lengths may be expressed in coarser units, e.g., in units of $1/4$th of a second.

The identifier is used to retrieve information from a database relating to the recordings played by the user. Specifically, the identifier is computed upon detection of a disc in the CD player of the user's computer and sent to a remote server hosting a Web site containing information about the CDs produced by a particular record company. The server uses the identifier as a key to lookup a single matching record in a database and outputs the information stored in that matching record. This information includes a Web address (URL) that is related to the audio CD (e.g., that of the artists' home page), simple data such as the names of the songs, and also complementary entertainment, including potentially video clips, which is accessed using the stored URL.

Among the disadvantages of such a system is that it does not account for differences in track times that may occur in different releases or pressings of CDs of the same recording. Such differences could result in an identifier being computed that does not match the identifier stored in the database, which in turn might prevent retrieval of the data relating to the recording. If the track length differences are large enough, then this problem would arise even if the identifier is expressed in coarser units than the data retrieved from the CD, e.g., rounded to the nearest $1/4$ second rather than $1/75$th second.

The '192 and '593 patents also purport to describe a "fuzzy comparison algorithm" for determining whether two CDs are the same. The algorithm involves truncating track lengths obtained from table of contents data and summing the total track time and track time differences between two CDs. These values are then used to determine a percentage that is "indicative of how well the two CDs match." It is unclear from the description in these patents how this algorithm is to be used. If it is used to find a match between a CD being played and an entry in a database, then such an approach has at least two disadvantages. First, this calculation would have to be performed for each and every entry in the database to find a single matching record, which would be extremely inefficient. Second, the truncation of the track lengths raises the possibility that two different CDs might yield the same truncated track lengths and be identified as a match. Or, as discussed above, two different pressings or releases of the same CD might yield different truncated track lengths and therefore would not be identified as a match. In either case, a correct matching record in the database would not be found.

Thus, the approaches taken in the '192 and '593 patents suffer from a number of disadvantages, because they are predicated on computing a single identifier for a recording and looking up information in a database containing only one matching record. What is needed is a system for efficiently retrieving information relating to a digital audio recording that takes into account differences in track lengths in different pressings or releases of a recording as well as their digitized versions stored on a PC.

SUMMARY OF THE INVENTION

It is an object of the present invention to provide systems and methods for providing a user with information relating to a digital audio recording by looking up the information in a database using a set of approximate track durations from a collection of the digital audio recordings (e.g. an audio CD).

It is another object of the present invention to provide systems and methods for accurately looking up information relating to a digital audio recording in a database using table of contents data read from the recording, even if the table of contents data varies due to differences in pressings or releases.

It is another object of the present invention to provide systems and methods for efficiently generating multiple records for a fuzzy database to account for variations in track duration data, without having to include an undue number of possible permutations of a table of contents data sequence.

In one aspect, the present invention provides a method and computer code for matching a track set from a digital audio recording to metadata relating to the recording. Track duration data is obtained for the track set, and the track duration data is rounded. A search is performed for matching records in a first database based on the rounded track duration data, each resulting matching record having an identifier. Track duration data is retrieved from a second database based on the identifiers associated with the matching records. If more than one matching record is found, the track duration data retrieved from the second database is compared to the track duration data obtained for the track set to find a best matching record of in the second database. Metadata contained in the best matching record of the second database is output.

Embodiments of the present invention may include one or more of the following features. For each matching record, the track duration data retrieved from the second database may be compared to the track duration data obtained for the track set to determine if each matching record meets a match quality threshold. The track duration data for the track set may be received by a server from a client device via a network and the metadata may be sent from the server to the client device via the network. Records of the first database may be generated by rounding a sequence of track durations computed from table of contents data for each recording of a collection of digital audio recordings. The computed sequence of track duration data for each recording may be obtained from the second database. The computed sequence of track durations for each recording may be truncated to a predetermined number of tracks. The best matching record of the second database may be determined by computing a sum of squared differences between a sequence of values in the track duration data retrieved from the second database and a corresponding sequence of values in the track duration data obtained for the track set.

The rounding of the sequence of track durations may include rounding each value in the sequence of track durations in a selected direction to a nearest integer multiple of a rounding factor when the value is not within a predetermined range of an integer multiple of the rounding factor. And, each value in the sequence of track durations may be rounded in both the selected direction and an opposite direction when the value is within the predetermined range of an integer multiple of the rounding factor.

Multiple records may be generated for the first database from the sequence of track durations when at least one value in the sequence is rounded in both the selected direction and the opposite direction. The multiple records may correspond to all possible permutations of the sequence resulting from values that have been rounded in both the selected direction and the opposite direction.

In another aspect, the present invention provides a method and computer code for generating records for a matching database for a collection of digital audio recordings. A sequence of track durations is obtained for each recording of the collection of recordings. Each value in the sequence of track durations is rounded in a selected direction to a nearest integer multiple of a rounding factor when the value is not within a predetermined range of an integer multiple of the rounding factor. Each value in the sequence of track durations is rounded in both the selected direction and an opposite direction when the value is within the predetermined range of an integer multiple of the rounding factor. Multiple records are generated from the sequence of track durations when at least one value in the sequence is rounded in both the selected direction and the opposite direction. The multiple records correspond to all possible permutations of the sequence resulting from values that have been rounded in both the selected direction and the opposite direction.

Embodiments of the present invention may include one or more of the following features. The sequence of track durations for each recording of the collection of recordings may be obtained from a second database containing a record corresponding to each recording, each record including metadata relating to the recording.

DETAILED DESCRIPTION OF THE PREFERRED EMBODIMENTS

Figure 1:
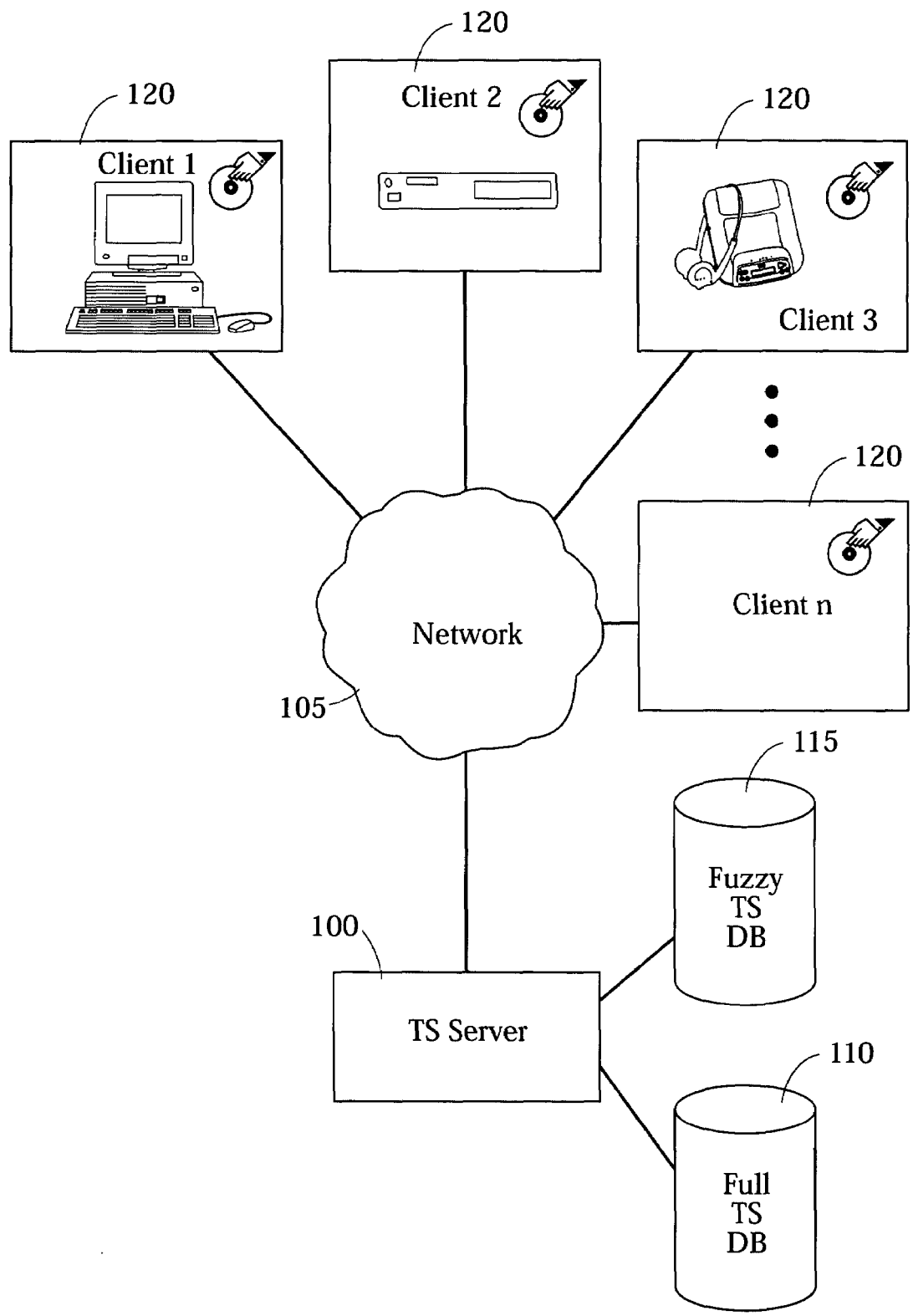
FIG. 1 is a block diagram illustrating a number of clients connected to a Track Set Server through a network.

Speaking generally, the present invention is practiced by deriving track duration data for a collection of audio tracks from table of contents (TOC) data stored on a digital audio recording using a computer or other playback device. Alternatively, track durations may be read directly from a collection of audio files (e.g. an album that has been digitized and stored on a computer using an audio player). The track duration data, which includes information regarding the length of each track and the number of tracks into which a recording is divided, is used to look up information about the audio recording, such as the title and artist, in a database generated using a fuzzy algorithm.

As used herein, the term "computer" may refer to a single computer or to a system of interacting computers. Generally speaking, a computer is a combination of a hardware system, a software operating system and perhaps one or more software application programs. Examples of computers include, without limitation, IBM-type personal computers (PCs) having an operating system such as DOS, Microsoft Windows, OS/2 or Linux; Apple computers having an operating system such as MAC-OS; hardware having a JAVA-OS operating system; graphical work stations, such as Sun Microsystems and Silicon Graphics Workstations having a UNIX operating system; PalmPilots; and Pocket PCs.

"Network" means a connection between any two or more computers, which permits the transmission of data. An example of a network, although it is by no means the only example, is the Internet.

"Web page" means any documents written in mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web site" means at least one Web page, and more commonly a plurality of Web pages, virtually connected to form a coherent group.

"Web browser" means any software program which can display text, graphics, or both, from Web pages on Web sites. Examples of Web browsers include, without limitation, Netscape Navigator and Microsoft Internet Explorer.

"Web server" refers to a computer or other electronic device which is capable of serving at least one Web page to a Web browser.

The phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

"Metadata" generally means data that describes data. In the context of the present invention, it means data that describes the contents of a digital audio recording. Such metadata may include, for example, artist information (e.g., name, birth date, discography, etc.), album information (e.g., title, review, track listing, sound samples, etc.), relational information (e.g., similar artists and albums), and other types of supplemental information.

"Frame", in the context of the present invention, refers to the smallest unit of time on a compact disc, which is $\frac{1}{75}$th of a second (2352 bytes of digital audio data).

For the present invention, a software application could be written in substantially any suitable programming language, which could easily be selected by one of ordinary skill in the art. The programming language chosen should be compatible with the computer by which the software application is executed, and in particular with the operating system of that computer. Examples of suitable programming languages include, but are not limited to, Object Pascal, C, C++, CGI, Java and Java Scripts. Furthermore, the functions of the present invention, when described as a series of steps for a method, could be implemented as a series of software instructions for being operated by a data processor, such that the present invention could be implemented as software, firmware or hardware, or a combination thereof.

With reference to FIG. 1, the system includes a track set (TS) server 100, which for example may be a Web server, operably connected to a network 105, e.g., the Internet. The TS server 100 includes a full track set database 110 that holds track duration data and information relating to digital audio recordings. The TS server 100 also includes a fuzzy track set database 115 that holds similar information, but is configured to allow more efficient data retrieval by using a fuzzy algorithm to generate matching keys, as described in detail below. Also connected to the network are a number of client devices 120, Client 1 through Client n, that are configured to read digital audio recordings and associated track duration data from media such as compact discs (CD) or local hard drives and send the track duration data to the TS server 100 to retrieve information relating to the recording. The client devices may be for example personal computers (Client 1), component CD players (Client 2) and portable CD players (Client 3). Other possibilities for client devices exist as well.

Each client 120 has hardware and software for communicating with the TS server 100. For example, a client computer may have an operating system with a graphical user interface (GUI) to access the Internet, and is preferably equipped with graphical World Wide Web (Web) browser software, such as Netscape Navigator™ or Microsoft Internet Explorer™, operable to read and send Hypertext Markup Language (HTML) forms from and to a Hypertext Transport Protocol (HTTP) server on the Web. Client CD players may have built-in interfaces that enable them to communicate with the TS server via the Internet, either directly or through a computer. For example, a CD player may have a data interface, such as a RS-232 or USB, that enables it to send and receive data from a computer, which in turn is connected to the Internet.

Likewise, the TS server 100 includes hardware and software for communicating with the clients 120. For example, the TS server 100 may have HTTP compliant software, an operating system and common gateway interface (CGI) software for interfacing with clients 120 via the Internet. Alternatively, the TS server 100 and clients 120 may run proprietary software that enables them to communicate via the Internet or some other type of network.

It will be readily appreciated that the schematic of FIG. 1 is exemplary only, and that numerous variations are plainly possible. For example, the TS server 100 may be connected to a local area network (LAN), which in turn may be connected to the network. The TS server 100 may be implemented using multiple Web servers. Also, the network 105 may be a local area network (LAN) or a wide area network (WAN) other than the Internet.

Figure 2:
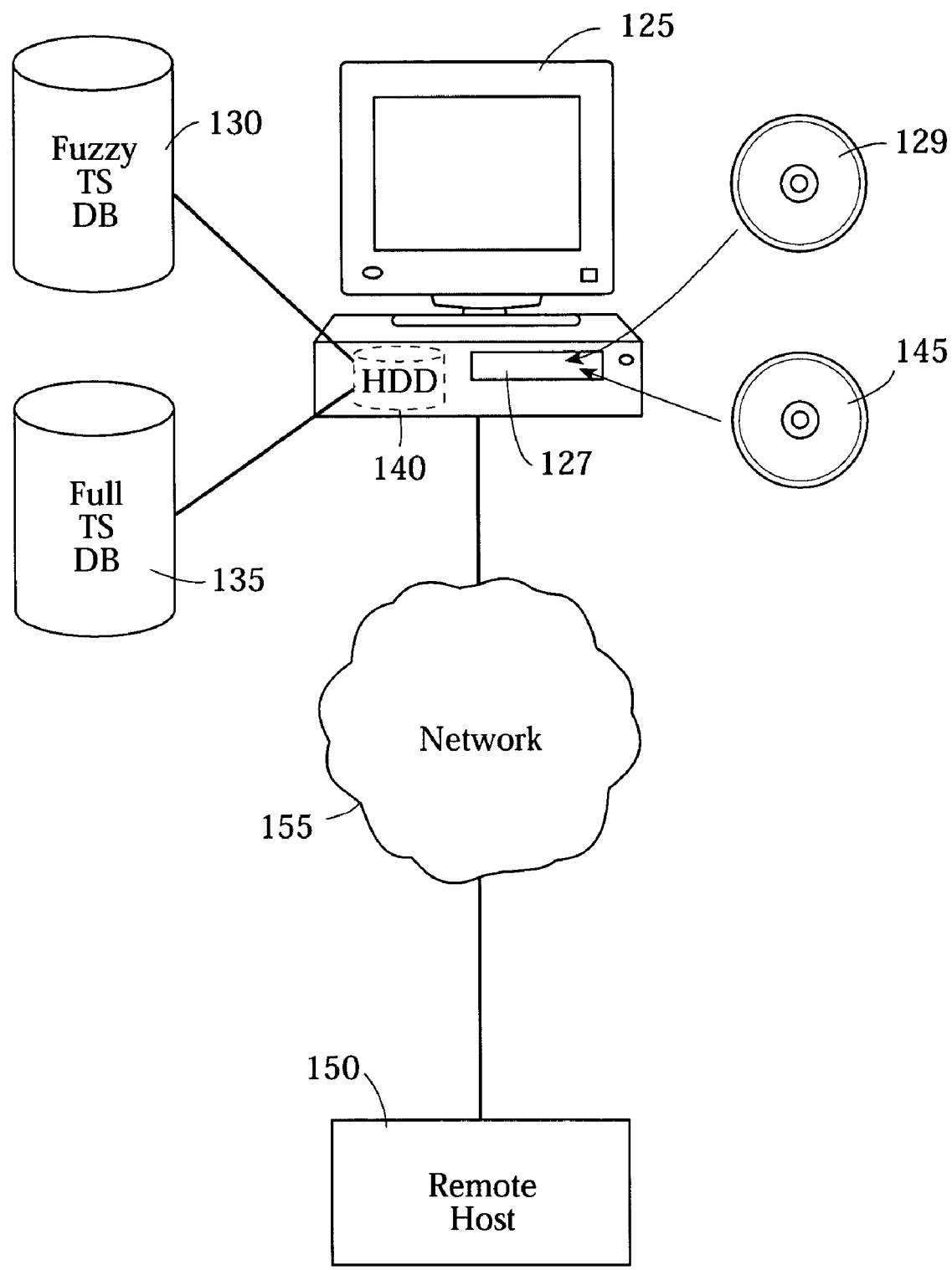
FIG. 2 is a block diagram illustrating a computer having local track durations databases.

Alternatively, as shown in FIG. 2, the invention may be implemented without client-server architecture and/or without a network; instead, all software and data necessary for the practice of the present invention may be stored on a storage device associated with the digital audio playback device. For example, a computer 125 may have a CD drive 127 to playback compact disc 129 digital audio. The computer 125 also may have a local fuzzy track set database 130 and a local full track set database 135 stored on a hard disk 140, each containing a complete set or a subset of the information available in the corresponding databases on the TS server 100. These databases 130 and 135 may be loaded onto the hard disk 140 from a CD-ROM 145, or the databases may be downloaded and updated from a remote host 150 via a network 155. For example, the databases may be downloaded from a Web site via the Internet. Other variations exist as well.

In a preferred embodiment of the present invention, track duration data may be derived from table of contents (TOC) data for a digital audio recording, such as a compact disc (CD). TOC data is stored on a CD using a format specified in the "Red Book" (Compact Disc Digital Audio System Description, Philips Corp., May 1999), which provides the standards for digital audio CDs. The TOC data consists of a string of concatenated track start times for every track on the disc, expressed as six-digit hexadecimal values. The track start times are provided in units of frames, and each frame is 1/75th of a second. The final six-digit value in the TOC data is the total disc time in frames. For example, the TOC data for a CD may be given by the following:

0000096004187006F2500C77C010EF0015F9A01DC9502 1F28025439028F23

This TOC data specifies a disc that is 37 minutes, 16 seconds, and 15 frames long: 028F23h=167715 frames=2236.2 seconds=37 min 16.2 s This TOC data specifies the track start times as:

| Track | Start Time |
| --- | --- |
| 1 | 000096h |
| 2 | 004187h |
| 3 | 006F25h |
| 4 | 00C77Ch |
| 5 | 010EF0h |
| 6 | 015F9Ah |
| 7 | 01DC95h |
| 8 | 021F28h |
| 9 | 025439h |

Thus, the seventh track, for example, starts at 27 minutes, 6 seconds, and 505 frames: 01DC95h=122005 frames=1626.7333 seconds=27 min 6.7333 s. Of course, the track duration for each track may be computed from the track start times and the total disc time.

As noted above, the TS server 100 maintains a full track set database 110 containing information relating to a known collection of digital audio recordings, such as for example artist name, birth date, discography, album title, reviews, track listings, sound samples, etc. This database is keyed according to a unique album identifier (A_ID) associated with each recording for which information is available. The full track set database 110 also contains a set of track durations computed from the track start times provided in the original TOC data strings for each recording.

The TS server 100 also maintains a fuzzy track set database 115 of album identifiers that is generated from full track set duration data using a fuzzy algorithm. The fuzzy algorithm allows for variability in the input track durations received from the client. Such variability may arise for example due to variations in CD pressings or various means of digitization. As described in further detail below, when the TS server 100 receives an input track duration data string from a client, it first performs a lookup operation in the fuzzy track set database 115 to retrieve an A_ID and then performs a lookup in the full track set database 110 to retrieve the metadata corresponding to the A_ID.

Figure 3:
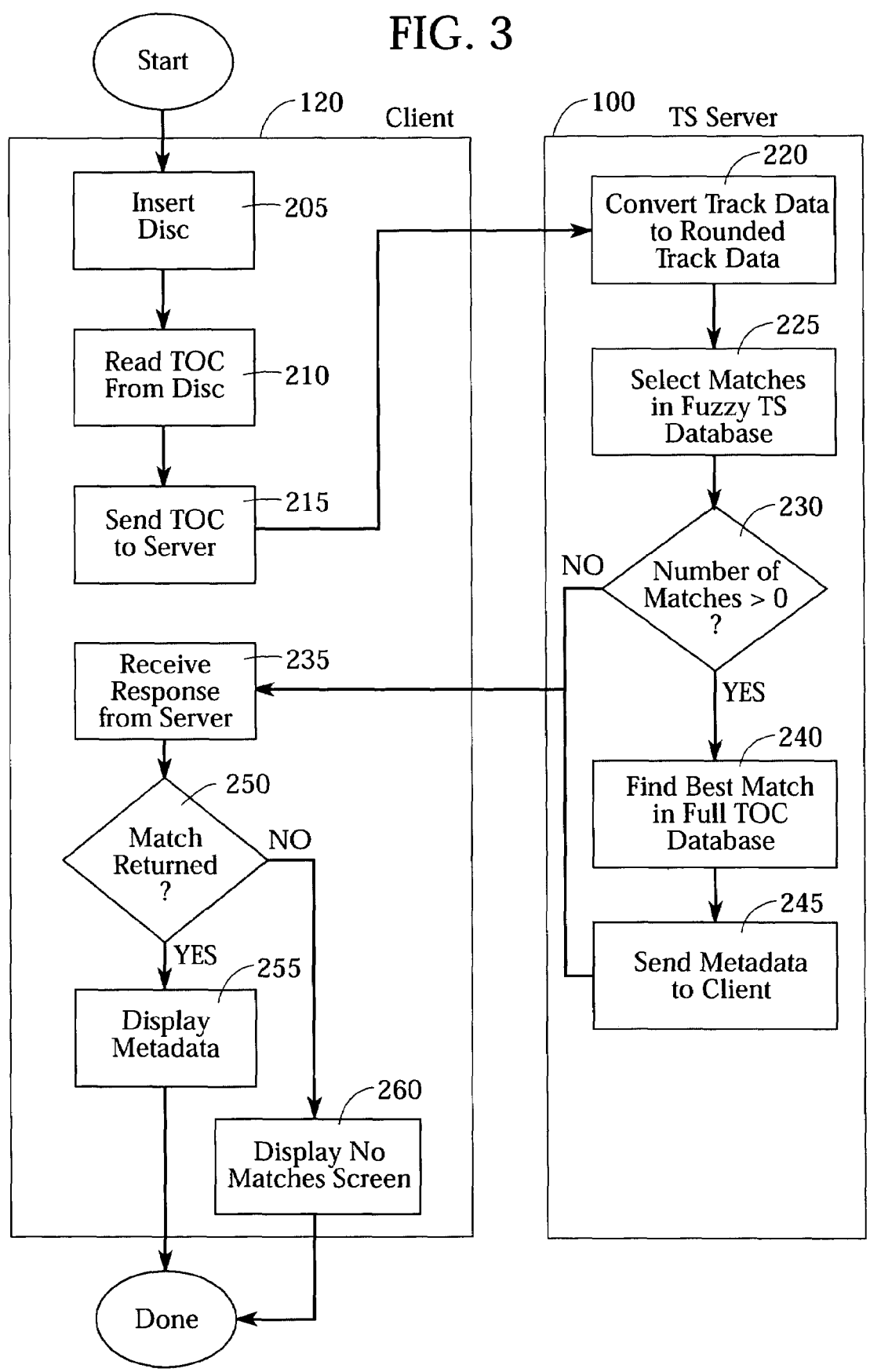
FIG. 3 is a flow chart illustrating a preferred embodiment of the present invention.

In the preferred embodiment of the present invention, as shown in FIG. 3, a user inserts a compact disc (step 205) into a client device 120, such as a personal computer. The TOC data is read from the disc (step 210) using standard calls to the CD application program interface (API), which is available under most commonly used operating systems. The TOC data is then converted into a sequence of track durations and sent to the TS server 100 via the network 105 (step 215). Alternatively, a sequence of track durations could be derived from a collection of digital files residing on a PC or any other storage device.

The TS server 100 receives the input data from the client device 120 and rounds and/or truncates the sequence of track durations (step 220). For example, the track duration input data may be truncated to a particular number of tracks, e.g., five. Then the data may be rounded in a particular direction using a particular rounding factor, e.g., 100 frames. For example, the data may be rounded down, in which case each track duration is rounded to the nearest 100 frames in the downward direction. Alternatively, the data may be rounded up, in which case each track duration is rounded to the nearest 100 frames in the upward direction. As a further alternative, the data may be rounded up or down to the nearest 100 frames, in which case each track duration is rounded in the upward or downward direction depending upon which is the shortest distance. Of course, one of ordinary skill in the art would understand that rounding a track duration down to the nearest 100 frames is the same as truncating the track duration by removing the two least significant digits (the ones and tens place digits). Thus, it is to be understood that the term "rounding," as used in this context, is the same as "truncating."

A lookup is performed in the fuzzy track set database 115 (step 225) using the rounded, truncated input string to determine if there are any matching entries (step 230), and an A_ID is returned for each match. If there are no matches, the TS server 100 sends a response to that effect back to the client 120 (step 235), otherwise, the TS server 100 performs a lookup in the full track set database 110 for each A_ID. If there is more than one match, the closest match may be determined, for example, by computing the sum of the squares of the track duration differences between the input string (before rounding) and the full track duration data string associated with each A_ID in the full track set database 110 (step 240). The closest match, or the only match if such is the case, may be compared to a quality threshold. If the sum of the squares of the track duration differences is less than or equal to the match quality threshold, the metadata associated with the A_ID for this match is sent back to the client 120 (steps 245 and 235).

After receiving the response from the TS server 100 (step 235), the client 120 determines whether a matching A_ID has been returned (step 250) and then may display the returned metadata (step 255) or a "no matches" screen, as appropriate (step 260). Other actions may be taken by the client 120 as well.

To generate the fuzzy track set database 115, a fuzzy algorithm is applied to the track duration data in the full track set database 110, which, as described above, comprises track durations for each track (computed from the track start times in the original TOC data string). As a first step, the fuzzy algorithm truncates the track duration data to a particular number of tracks (T), e.g., T=5. The algorithm then rounds each track duration of the truncated data string in the following manner to produce a rounded, truncated substring.

Figure 4:
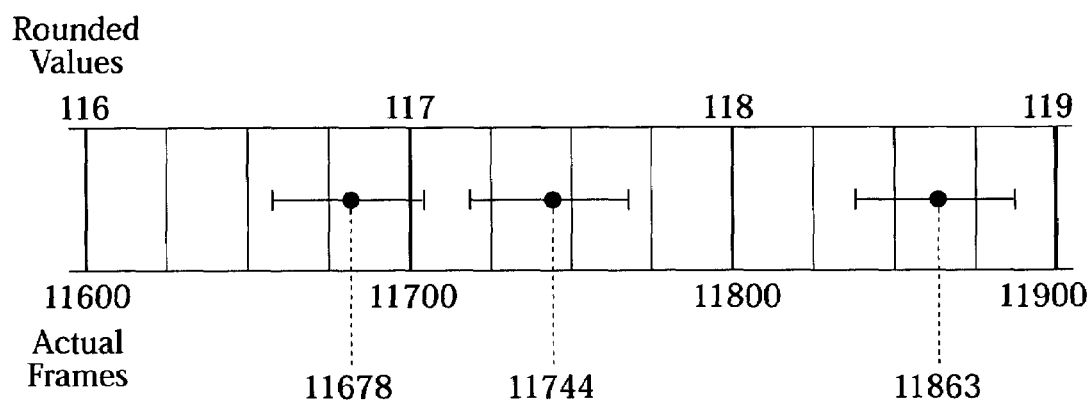
FIG. 4 is a diagram illustrating a rounding technique employed by the present invention.

FIG. 4 illustrates the manner in which the track durations are rounded. A particular rounding factor (N) is used, e.g., N=100 frames, and a particular direction is selected, e.g., the downward direction, in which case each track duration is rounded down to the near 100 frames. For example, a track duration of 11678 frames would be rounded to 11600 frames, a time of 11744 frames would be rounded to 11700 frames, and a time of 11863 frames would be rounded to 11800 frames. After rounding, only the significant digits need be retained, so these times maybe expressed as 116, 117, and 118, respectively. Up to this point, the truncation and rounding are similar to that done to the track duration input data received from the client. However, the following additional steps are performed on the data stored in the fuzzy track set database.

Rounding the track durations raises the possibility that an input string that varies somewhat from the full track duration data string may round to a different result, thereby resulting in a match not being found due to a rounding boundary effect. For example, if the second pressing of a CD has a track duration of 11744 for a particular track, instead of 11678, then that time would be rounded to 117, rather than 116. This would result in a match not being found in the fuzzy track durations database for a CD from the second pressing. To avoid this problem, multiple entries may be provided in the fuzzy track set database for a particular recording, i.e., a particular album identifier.

One way of generating multiple entries for the fuzzy track set database would be to round each track duration both up and down and include every possible permutation of these multiple rounded track durations. This method, however, would be inefficient, as it would result in a database having $2^T$ entries (where T is the number of tracks in the truncated string) for each A_ID. Instead, a track duration will be rounded both up and down only if it is within a certain number of frames (P) of an integral multiple of the rounding factor (N). The number of frames in this rounding interval (P) is preferably chosen to be the rounding factor (N) divided by four, e.g., P=N/4=25, which is an equidistant division point between the rounding mid-point and the rounding boundary.

The division of the rounding factor by four results in a rounding interval (P) that is an optimum balance between redundancy and recognition quality. By comparison, division of the rounding factor by two results in every possible permutation being produced, because a value is always within a distance of less than half the rounding interval of the nearest rounding boundary, e.g., within 50 frames of the nearest integer multiple of 100 frames. Also, division of the rounding factor by an integer greater than four increases the possibility of missed matches, as discussed below.

For example, referring again to FIG. 4, the value 11678 is within 25 frames of 11700, so it would be rounded both up to 117 and down to 116. Whereas, the value 11744 is not within 25 frames of a multiple of 100 frames and would therefore be rounded down to 117. Likewise, the value 11863 would be rounded down to 118. Multiple fuzzy track duration data strings are produced from the rounded values as follows.

Figure 5:
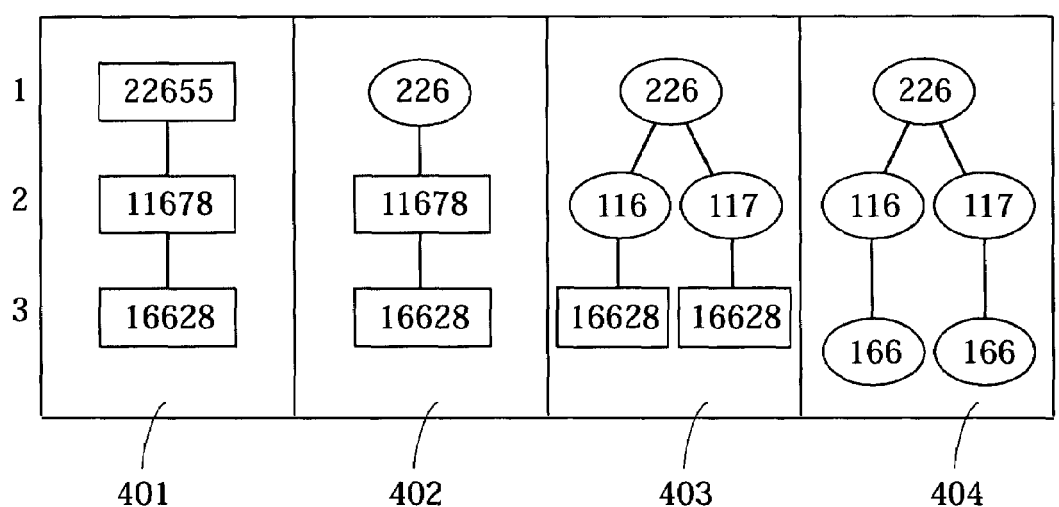
FIG. 5 is a diagram illustrating the generation of multiple entries for the fuzzy track durations database.

Referring to FIG. 5, assume a track durations data string is truncated to three tracks, with track durations of 22655, 11678, and 16628 frames, respectively (step 401). The value 22655 (Track 1) is not within 25 frames of a multiple of 100 frames (i.e., 22600 or 22700), so it is rounded down to 226 (step 402). The value 11678 (Track 2) is within 25 frames of 11700, so it is rounded to 116 and 117 (step 403). These two values are diagramed as separate branches of a tree structure to illustrate the multiple sequences of track durations that may be derived therefrom. The value 16628 (Track 3) is not within 25 frames of a multiple of 100 frames, so it rounded down to 166 (step 404). This value is diagramed in each of the two branches of the tree structure. This process results in the following track duration sequences, which each become entries in the fuzzy track set database:

226 116 166
226 117 166

The inclusion of multiple entries in the fuzzy track set database generated in this manner ensures a guaranteed accuracy of P frames. In other words, an input track duration string (before rounding and truncation) having track durations within P frames of corresponding track durations of the full track duration data string will result in a correct match in the fuzzy track set database. For the example above, an input string having track durations within 25 frames of the values 22655, 11678, and 16628, respectively, will result in a correct match.

The foregoing detailed description is intended to be illustrative and not limiting of the present invention, which is defined by the claims set forth below.

What is claimed is:

1. A method for matching a track set from a digital audio recording to metadata relating to the recording, the method comprising:
  obtaining track duration data for the track set;
  rounding the track duration data for the track set;
  searching for matching records in a first database based on the rounded track duration data, each resulting matching record having an identifier, wherein records of the first database are generated by rounding a sequence of track durations computed from a table of contents data for each recording of a collection of digital audio recordings, wherein the rounding comprises:
    generating a rounding entry for each value in the sequence of track durations by rounding each value in the sequence of track durations in a selected direction to a nearest integer multiple of a rounding factor when the value is not within a predetermined range of an integer multiple of the rounding factor, and
    generating a first rounding entry and a second rounding entry for each value in the sequence of track durations when the value is within the predetermined range of an integer multiple of the rounding factor, the first rounding entry being the rounded value in the selected direction and the second rounding entry being at least one of an increment and a decrement of the first rounding entry;
  generating multiple records for the first database from the sequence of track durations when at least one value in the sequence generates the first and second rounding entries;
  retrieving track duration data from a second database based on the identifiers associated with the matching records;
  comparing, if more than one matching record is found, the track duration data retrieved from the second database to the track duration data obtained for the track set to find a best matching record in the second database; and
  outputting metadata contained in the best matching record of the second database.

2. The method according to claim 1, further comprising comparing, for each matching record, the track duration data retrieved from the second database to the track duration data obtained for the track set to determine if each matching record meets a match quality threshold.

3. The method according to claim 1, wherein the track duration data for the track set is received by a server from a client device via a network and the metadata is sent from the server to the client device via the network.

4. The method according to claim 1, wherein the computed sequence of track duration data for each recording is obtained from the second database.

5. The method according to claim 1, wherein the computed sequence of track durations for each recording is truncated to a predetermined number of tracks.

6. The method according to claim 1, wherein the multiple records correspond to all possible permutations of the sequence resulting from values that generate first and second rounding entries.

7. The method according to claim 1, wherein the best matching record of the second database is determined by computing a sum of squared differences between a sequence of values in the track duration data retrieved from the second database and a corresponding sequence of values in the track duration data obtained for the track set.

8. A system for providing information relating to a digital audio recording to a client device, the system comprising:
  a server configured to receive track duration data for the digital audio recording via a network;
  a first database configured to allow matching records to be found based on the track duration data after the track duration data has been rounded, each matching record having an identifier, wherein records of the first database are generated by rounding a sequence of track durations computed from a table of contents data for each recording of a collection of digital audio recordings, wherein the rounding comprises:
    generating a rounding entry for each value in the sequence of track durations by rounding each value in the sequence of track durations in a selected direction to a nearest integer multiple of a rounding factor when the value is not within a predetermined range of an integer multiple of the rounding factor,
    generating a first rounding entry and a second rounding entry for each value in the sequence of track durations when the value is within the predetermined range of an integer multiple of the rounding factor, the first rounding entry being the rounded value in the selected direction and the second rounding entry being at least one of an increment and a decrement of the first rounding entry,
    wherein multiple records are generated for the first database from the sequence of track durations when at least one value in the sequence generates the first and second rounding entries;
  a second database configured to allow track duration data to be retrieved based on the identifiers associated with the matching records found in the first database;
  a comparison module for comparing the track duration data retrieved from the second database to the track durations data received for the recording to find a best matching record of the second database; and
  an output module for sending information relating to the recording contained in the best matching record of the second database to the client device via the network.

9. Computer code stored on a computer readable storage medium for matching a track set from a digital audio recording to metadata relating to the recording, the computer code comprising:
  code for obtaining track duration data for the track set;

code for rounding the track duration data for the track set;

code for searching for matching records in a first database based on the rounded track duration data, each resulting matching record having an identifier, wherein records of the first database are generated by rounding a sequence of track durations computed from a table of contents data for each recording of a collection of digital audio recordings, wherein computer code for the rounding of the sequence of track durations comprises:

generating a rounding entry for each value in the sequence of track durations by rounding each value in the sequence of track durations in a selected direction to a nearest integer multiple of a rounding factor when the value is not within a predetermined range of an integer multiple of the rounding factor, and generating a first rounding entry and a second rounding entry for each value in the sequence of track durations when the value is within the predetermined range of an integer multiple of the rounding factor, the first rounding entry being the rounded value in the selected direction and the second rounding entry being at least one of an increment and a decrement of the first rounding entry;

generating multiple records for the first database from the sequence of track durations when at least one value in the sequence generates the first and second rounding entries;

code for retrieving track duration data from a second database based on the identifiers associated with the matching records; and code for comparing, if more than one matching record is found, the track duration data retrieved from the second database to the track duration data obtained for the track set to find a best matching record in the second database;

code for outputting metadata contained in the best matching record of the second database.

10. The computer code according to claim 9, further comprising code for comparing, for each matching record, the track duration data retrieved from the second database to the track duration data obtained for the track set to determine if each matching record meets a match quality threshold.

11. The computer code according to claim 9, wherein the track duration data for the track set is received by a server from a client device via a network and the metadata is sent from the server to the client device via the network.

12. The computer code according to claim 9, wherein the computed sequence of track duration data for each recording is obtained from the second database.

13. The computer code according to claim 9, wherein the computed sequence of track durations for each recording is truncated to a predetermined number of tracks.

14. The computer code according to claim 9, wherein the multiple records correspond to all possible permutations of the sequence resulting from values that have been rounded.

15. The computer code according to claim 9, wherein the best matching record of the second database is determined by computing a sum of squared differences between a sequence of values in the track duration data retrieved from the second database and a corresponding sequence of values in the track duration data obtained for the track set.

* * * * *

UNITED STATES PATENT AND TRADEMARK OFFICE
CERTIFICATE OF CORRECTION

PATENT NO.        : 7,359,900 B2
APPLICATION NO.   : 10/629372
DATED             : April 15, 2008
INVENTOR(S)       : Vladimir Askold Bogdanov It is certified that error appears in the above-identified patent and that said Letters Patent is hereby corrected as shown below:

[57] ABSTRACT

Line 12, "of" should be deleted.

COLUMN 1

Line 42, "potentially" should read --, potentially,--.

COLUMN 4

Line 67, "particular" should read --particular,--.

COLUMN 5

Line 10, "which for example" should read --which, for example,--.
  Line 24, "be for example" should read --be, for example,--.

COLUMN 6

Line 22, "0000096004187006F2500C77010EF00159A01DC9502
            1F28025439028F23" should read
    --000096004187006F2500C77010EF00159A01DC9502
            1F28025439028F23--.
  Line 49, "as for example" should read --as, for example,--.
  Line 62, "arise" should read --arise,--.
  Line 63, "example" should read --example,--.

COLUMN 8

Line 5, "near" should read --nearest--.

UNITED STATES PATENT AND TRADEMARK OFFICE
CERTIFICATE OF CORRECTION

PATENT NO. : 7,359,900 B2
APPLICATION NO. : 10/629372
DATED : April 15, 2008
INVENTOR(S) : Vladimir Askold Bogdanov It is certified that error appears in the above-identified patent and that said Letters Patent is hereby corrected as shown below:

COLUMN 9

Line 3, "rounded" should read --is rounded--.

COLUMN 12

Line 3, "database;" should read --database; and--.

Signed and Sealed this

Twenty-sixth Day of August, 2008

JON W. DUDAS
*Director of the United States Patent and Trademark Office*